(12) United States Patent
Gannon

(10) Patent No.: US 11,790,366 B2
(45) Date of Patent: *Oct. 17, 2023

(54) WIRELESS DEVICES FOR STORING A FINANCIAL ACCOUNT CARD AND METHODS FOR STORING CARD DATA IN A WIRELESS DEVICE

(71) Applicant: Capital One Services, LLC, McLean, VA (US)

(72) Inventor: Gregory Gannon, Montpelier, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,507

(22) Filed: Oct. 11, 2022

(65) Prior Publication Data
US 2023/0061092 A1 Mar. 2, 2023

Related U.S. Application Data

(63) Continuation of application No. 15/975,947, filed on May 10, 2018, now Pat. No. 11,538,035, which is a
(Continued)

(51) Int. Cl.
| | |
|---|---|
| *G06Q 20/40* | (2012.01) |
| *G06Q 20/20* | (2012.01) |
| *G06Q 20/32* | (2012.01) |
| *G06Q 20/22* | (2012.01) |
| *G06Q 20/34* | (2012.01) |
| *G07C 9/25* | (2020.01) |

(Continued)

(52) U.S. Cl.
CPC ....... *G06Q 20/40145* (2013.01); *G06K 7/087* (2013.01); *G06K 7/089* (2013.01); *G06K 7/10386* (2013.01); *G06K 7/10415* (2013.01); *G06K 19/08* (2013.01); *G06Q 20/20* (2013.01); *G06Q 20/204* (2013.01); *G06Q 20/227* (2013.01); *G06Q 20/32* (2013.01); *G06Q 20/322* (2013.01); *G06Q 20/327* (2013.01); *G06Q 20/3223* (2013.01); *G06Q 20/3226* (2013.01); *G06Q 20/3278* (2013.01); *G06Q 20/353* (2013.01); *G06Q 20/3567* (2013.01); *G06Q 20/405* (2013.01); *G06Q 20/409* (2013.01); *G06Q 20/4012* (2013.01); *G07C 9/257* (2020.01); *G07C 9/26* (2020.01)

(58) Field of Classification Search
CPC ...................................... G06Q 40/00
USPC ...................................... 705/35, 38
See application file for complete search history.

(56) References Cited

U.S. PATENT DOCUMENTS

| | | | | |
|---|---|---|---|---|
| 5,953,710 A | * | 9/1999 | Fleming | G06Q 20/405 235/380 |
| 6,993,510 B2 | * | 1/2006 | Guy | G06Q 20/04 705/72 |

(Continued)

*Primary Examiner* — Kirsten S Apple
(74) *Attorney, Agent, or Firm* — Perkins Coie LLP

(57) ABSTRACT

A non-transitory computer-readable medium stores instructions causing a processor to generate a menu displaying representations of a plurality of cards, the cards having associated card data; receive, from a user input device, a selection corresponding to a selected one of the cards; update the menu to display a representation of the selection; and authorize transmission of the card data associated with the selected card to complete a transaction.

20 Claims, 15 Drawing Sheets

Related U.S. Application Data continuation of application No. 15/866,595, filed on Jan. 10, 2018, now Pat. No. 10,198,730, which is a continuation of application No. 15/393,140, filed on Dec. 28, 2016, now Pat. No. 9,870,563, which is a continuation of application No. 15/239,761, filed on Aug. 17, 2016, now Pat. No. 9,959,541, which is a continuation of application No. 14/940,901, filed on Nov. 13, 2015, now Pat. No. 9,471,922, which is a continuation of application No. 14/327,294, filed on Jul. 9, 2014, now Pat. No. 9,218,597, which is a continuation of application No. 13/965,769, filed on Aug. 13, 2013, now Pat. No. 9,165,296, which is a continuation of application No. 13/188,178, filed on Jul. 21, 2011, now Pat. No. 8,528,812, which is a continuation of application No. 11/226,219, filed on Sep. 15, 2005, now Pat. No. 7,997,476.

(51) Int. Cl.
*G06K 7/08* (2006.01)
*G06K 7/10* (2006.01)
*G06K 19/08* (2006.01)
*G07C 9/26* (2020.01)

(56) References Cited

U.S. PATENT DOCUMENTS

| | | | | |
|---|---|---|---|---|
| 7,086,586 B1 * | 8/2006 | Sullivan | G06Q 30/0277 | 235/382 |
| 7,096,494 B1 * | 8/2006 | Chen | H04L 9/3247 | 380/278 |
| 7,155,411 B1 * | 12/2006 | Blinn | G06Q 30/0234 | 705/40 |
| 7,213,742 B1 * | 5/2007 | Birch | G06Q 30/0222 | 705/14.27 |
| 7,400,883 B2 * | 7/2008 | Rivers | G06Q 40/00 | 705/68 |
| 7,631,803 B2 * | 12/2009 | Peyret | G06Q 20/10 | 235/380 |
| 7,757,944 B2 * | 7/2010 | Cline | G06Q 30/0601 | 705/16 |
| 7,860,790 B2 * | 12/2010 | Monk | G06Q 40/03 | 705/35 |
| 7,925,285 B2 * | 4/2011 | Indirabhai | H04W 56/00 | 375/354 |
| 2002/0095389 A1 * | 7/2002 | Gaines | G06Q 20/04 | 705/67 |
| 2002/0174016 A1 * | 11/2002 | Cuervo | G07F 19/20 | 705/16 |
| 2003/0172039 A1 * | 9/2003 | Guy | G06Q 20/403 | 705/68 |
| 2004/0243496 A1 * | 12/2004 | Kim | G07F 7/1008 | 705/50 |
| 2004/0249753 A1 * | 12/2004 | Blinn | G06Q 40/00 | 705/41 |
| 2005/0021457 A1 * | 1/2005 | Johnson | G06Q 20/04 | 705/39 |
| 2007/0162369 A1 * | 7/2007 | Hardison, III | G06Q 40/06 | 705/35 |
| 2007/0174166 A1 * | 7/2007 | Jones | G06Q 30/02 | 705/35 |
| 2007/0262140 A1 * | 11/2007 | Long, Sr. | G06Q 20/04 | 235/380 |
| 2009/0281941 A1 * | 11/2009 | Worth | G06Q 20/04 | 705/39 |
| 2009/0281951 A1 * | 11/2009 | Shakkarwar | G06Q 20/04 | 705/67 |
| 2010/0063906 A1 * | 3/2010 | Nelsen | G06Q 20/363 | 705/30 |
| 2010/0076833 A1 * | 3/2010 | Nelsen | G06Q 20/06 | 705/26.1 |
| 2010/0088188 A1 * | 4/2010 | Kumar | G06Q 20/202 | 705/17 |

* cited by examiner

WIRELESS DEVICES FOR STORING A FINANCIAL ACCOUNT CARD AND METHODS FOR STORING CARD DATA IN A WIRELESS DEVICE

CROSS-REFERENCE TO RELATED APPLICATION(S)

This application is a continuation of U.S. patent application Ser. No. 15/975,947, filed May 10, 2018, which is a continuation of U.S. patent application Ser. No. 15/866,595, filed Jan. 10, 2018, which is a continuation of U.S. patent application Ser. No. 15/393,140, filed Dec. 28, 2016, which is a continuation of U.S. patent application Ser. No. 15/239,761, filed Aug. 17, 2016, which is a continuation of U.S. patent application Ser. No. 14/940,901, filed Nov. 13, 2015, which is a continuation of U.S. patent application Ser. No. 14/327,294, filed Jul. 9, 2014, which is a continuation of U.S. patent application Ser. No. 13/965,769, filed Aug. 13, 2013, which is a continuation of U.S. patent application Ser. No. 13/188,178, filed Jul. 21, 2011, which is a continuation of U.S. patent application Ser. No. 11/226,219, filed Sep. 15, 2005. The content of the foregoing applications is incorporated herein in its entirety by reference.

This application is further related to U.S. patent application Ser. No. 16/230,833, filed Dec. 21, 2018, which is a continuation of U.S. patent application Ser. No. 15/975,947, filed May 10, 2018. The content of the foregoing applications is incorporated herein in its entirety by reference.

DESCRIPTION

Embodiments consistent with the present invention provide wireless devices capable of storing a financial account card and methods for storing card data in a wireless device. In particular, embodiments consistent with the present invention provide a wireless device capable of reading card data from a financial account card that is inserted into the wireless device. The wireless device may store the card data and transmit the card data by radio frequency.

BACKGROUND

In a conventional credit card transaction, a credit card holder presents a financial account card, such as a credit card, to a merchant. The merchant typically swipes a magnetic stripe on the credit card through a card reader that is built into or attached to a point-of-sale (POS) terminal. The magnetic stripe generally includes account information, such as an account number of the card, an identity of the card holder, and an expiration date of the card. Once the merchant has swiped the card through the card reader, the account information is transmitted to the POS terminal. Alternatively, instead of the merchant swiping the card, the credit card holder may personally swipe the card at a self service check out station or may insert the card into a card reader built into, for example, a gasoline pump. Once the card reader has read the card data, the card data is transmitted over a secure network, authenticated, and ultimately used to authorize a transaction. In any of these kinds of transactions, however, the credit card must be physically read by a magnetic stripe reader in order to obtain the card data that is stored on the magnetic stripe.

As the prevalence of wireless devices continues to increase, new methods of storing and transmitting credit card data have begun to emerge. One such example is to use RFID (radio frequency identification) tags for transmitting payment information. RFID tags are microchips, some versions of which may store and encrypt data. Others may receive and transmit data from a processor. An RFID tag acts as a transponder and is capable of transmitting a radio frequency signal when the RFID tag receives a query radio signal from another device. Typically, the other device is an RFID reader that sends a query signal requesting a nearby RFID tag to transmit data to the RFID reader. When the RFID tag receives the query signal, the RFID tag may be powered into an "on" state. Alternatively, the RFID tag may have its own independent power supply. In either case, when an RFID tag receives a query radio signal, the RFID tag may respond by transmitting data to the reader up to a distance of a several inches or feet away, depending upon the power capabilities of the RFID tag.

In recent years, RFID tags have been incorporated in wireless devices, such as cellular phones. In addition to cellular phones, other wireless devices, such as PDAs, for example, are also being equipped with RFID tags. There are many possibilities regarding the kinds of information that an RFID tag may store and transmit. One type of information that an RFID tag may transmit is card data that provides payment information for a transaction. For example, a transaction may involve providing information for an account, such as a credit card account. In the example of a cellular phone, the card data may be securely transmitted using encryption techniques to an RFID reader when the cellular phone is placed in close proximity to the RFID reader. Accordingly, a cellular phone storing credit card data in an RFID tag or in a memory accessible by an RFID tag may be used as a payment device without requiring the actual credit card to be swiped by a magnetic card reader.

A problem often arises, however, when existing technologies must be updated or replaced to take full advantage of new technological advancements. While the transition between new and old may take a substantial amount of time due to costs associated with upgrading the existing systems, savings may result over the long term by upgrading those systems. However, companies may decide to delay a technological upgrade because it may take time to build consumer support for the upgraded system. As a result, the company may decide to delay an upgrade until more consumers have embraced the new technology. The slow acceptance of wireless devices equipped with RFID tags, along with the need for merchants to upgrade their card readers to handle payments from wireless devices, has slowed the implementation of RFID technology at POS terminals.

Consequentially, a compatibility issue has arisen because many merchants have not yet invested in RFID readers, which are needed to receive the radio signal sent by the RFID tag included in a wireless device. Instead, many merchants continue to accept payment by swiping a credit card through a magnetic card reader. Furthermore, many consumers have not yet purchased or begun using wireless devices that are equipped with RFID technology. Still further, those consumers that do have wireless devices that are equipped with RFID technology may be slow to adopt RFID features due to inexperience or security concerns. Since few consumers have adopted the technology, merchants are also unwilling to invest financially in RFID readers that are needed to receive card data providing payment information since few customers will actually make use of the technology. Transitioning more merchants will take time. While consumers continue to adopt devices using RFID technology for making card transactions and merchants invest in RFID readers, merchants will need to continue to use traditional magnetic stripe readers for processing credit card transitions. Accordingly, a transition from magnetic stripe readers to RFID readers for reading card data for a substantial number of transactions will likely occur over an extended time period due to both the costs involved and the slow adoption by consumers of wireless devices equipped with RFID tags. Furthermore, since consumers may continue to present credit cards to merchants, merchants will need to retain traditional magnetic stripe readers.

During this transitional period, there is a need for a device that bridges traditional credit card transactions and transactions that are made using wireless devices. Such a device would allow the consumer to conveniently select which type of transaction to make depending upon the merchant's technical capabilities. As a result, a consumer will be able to take advantage of the convenience of RFID technology where available but, at the same time, retain the flexibility of a traditional card. Furthermore, consumers will demand a sense of security when making transactions using RFID technology before the technology will be accepted on a large scale.

SUMMARY

Consistent with an embodiment of the present invention, a method is provided for enabling a wireless device to use card data during a purchase transaction. The method comprises receiving a financial account card into a slot of the wireless device, wherein the financial account card is stored inside of the wireless device; scanning, by a scanner included in the wireless device, a magnetic stripe on the financial account card when the financial account card is inserted into the slot; reading, from the magnetic stripe, card data; and enabling the wireless device to use the card data during the purchase transaction.

Consistent with another embodiment of the present invention a wireless device is provided. The wireless device comprises a processor; an RFID chip; and a slot for receiving a financial account card, wherein the financial account card may be stored inside of the wireless device, wherein the processor communicates card data from the financial account card to the RFID chip.

Consistent with another embodiment of the present invention, a method is provided for storing card data in a wireless device. The method comprises scanning, when a financial account card is inserted into a slot of the wireless device, card data with a magnetic stripe reader included in the wireless device; storing, in a memory include in the wireless device, a name that identifies the financial account card; and storing the card data in the memory of the wireless device, wherein the scanned card data is associated with the stored name.

Consistent with another embodiment of the present invention, a method is provided for authorizing use of a financial account card for making a purchase with a wireless device. The method comprises reading card data from a financial account card inserted into a slot of the wireless device; storing the card data in a memory included in the wireless device; receiving a security code to authorize use of the card data; and transmitting, when the security code has been authenticated, the card data from the wireless device to an RFID reader via radio frequency.

Consistent with yet another embodiment of the present invention, a method is provided for authorizing use of a financial account card for making a purchase with a wireless device. The method comprises reading card data from a financial account card inserted into a slot of the wireless device; storing the card data in a memory included in the wireless device; receiving an authorization authorizing use of the card data; and transmitting the card data from the wireless device to an RFID reader via radio frequency.

Consistent with yet another embodiment of the present invention, a method is provided for authorizing use of a financial account card for making a purchase with a wireless device. The method comprises receiving a selection of a financial account card from a display of the wireless device; determining, by a processor including in the wireless device, whether the selected financial account card is stored inside the wireless device; and when the selected financial account card is determined to be stored inside the wireless device, authorizing use of the selected financial account card.

Consistent with still yet another embodiment of the present invention, a method is provided for authorizing use of a financial account card to make a purchase using a wireless device. The method comprises receiving a selection of a financial account card from a display of the wireless device; determining, by a processor included in the wireless device, whether the selected financial account card has been used to make a prior purchase using the wireless device; and when the selected financial account card has not been used to make a prior purchase using the wireless device, authorizing the selected financial account card.

Consistent with another embodiment of the present invention, a method is provided for selecting a financial account card to provide a payment for a purchase made using a wireless device. The method comprises receiving, via radio frequency, data reflecting a purchase transaction; automatically selecting a financial account card to provide the payment for the purchase based on the received purchase transaction data; and transmitting via radio frequency card data for the selected financial account card.

Consistent with another embodiment of the present invention, a method is provided for assigning a financial account card to provide a payment for a purchase transaction made using a wireless device. The method comprises receiving a selection of a financial account card from a display of the wireless device; assigning the selected financial account card to a type of purchase; receiving, via radio frequency, data reflecting the purchase transaction; determining, by a processor including in the wireless device, whether the received purchase transaction data corresponds to the purchase type assigned to the selected financial account card; and when the purchase transaction data is determined to correspond to the purchase type assigned to the selected financial account card, transmitting card data for the selected financial account card.

Consistent with yet another embodiment of the present invention, a method is provided for authorizing use of a financial account card to make a payment for a purchase transaction using a wireless device. The method comprises receiving, from a display of the wireless device, a selection of a financial account card belonging to the user of the wireless device; determining, by a processor included in the wireless device, whether any financial account card belonging to the user, including the selected financial account card, is stored inside the wireless device; and when any financial account card belonging to the user is determined to be stored inside the wireless device, authorizing the use of the selected financial account card for the purchase transaction.

Consistent with yet another embodiment of the present invention, a method is provided for a security feature for card data of a financial account card for storage in a wireless device. The method comprises receiving the financial account card into a slot of the wireless device, wherein the financial account card is stored inside of the wireless device;

reading card data from the financial account card; storing the card data in a memory included in the wireless device; and when the financial account card is removed from the slot of the wireless device, erasing the stored card data.

Consistent with still yet another embodiment of the present invention, a method is provided for authorizing a financial account card to make a purchase using a wireless device. The method comprises receiving a selection of a financial account card from a display of the wireless device; determining, by a processor included in the wireless device, an identity of the owner of the selected financial account card; determining, by the processor, an identify of an owner of a financial account card stored in the wireless device; and when the identify of the owner of the selected financial account card and the identify of the owner of the financial account card stored in the wireless device are the same, authorizing the selected financial account card to make a purchase.

Consistent with still yet another embodiment of the present invention, a method is provided for authorizing a second party to use a financial account card to make a purchase using a wireless device. The method comprises receiving a selection of a financial account card from a display of the wireless device; assigning, to the selected financial account card, an identity of a second party that is authorized to use the selected financial account card; determining, by a processor included in the wireless device, an identity of a user of the wireless device; and when the identify of the user of the wireless device is determined to be the authorized second party, authorizing the selected financial account card to make a purchase.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention. In the drawings.

DESCRIPTION OF THE EMBODIMENTS

Figure 1:
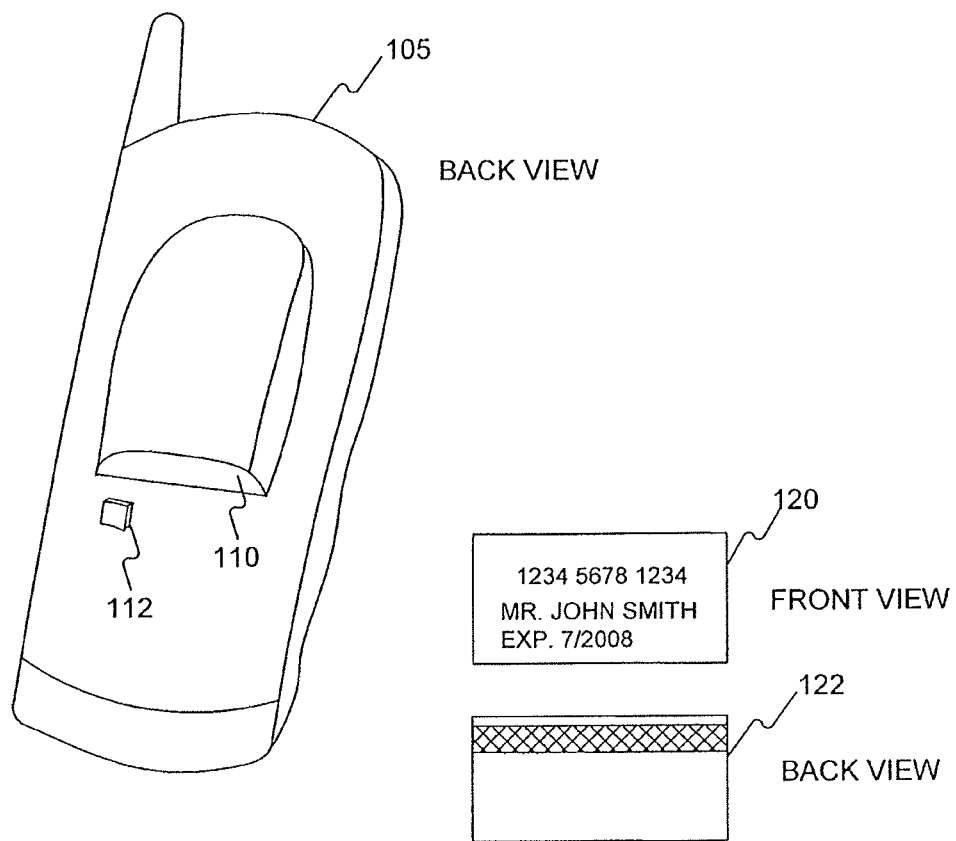
FIG. 1 shows an exemplary wireless device including a card slot for inserting a financial account card.

Embodiments consistent with the present invention provide a wireless device capable of receiving a financial account card, such as a credit card, into a card slot of the wireless device. Card data, such as account information, may be read from the card by a magnetic stripe reader as it is inserted into the card slot of the wireless device. Inserting a financial account card into the wireless device may enable and program an RFID (radio frequency identification) tag in the wireless device. For example, the wireless device may include a processor that instructs a magnetic card reader to read the magnetic stripe of the card and transmit card data to the RFID tag in the wireless device. Card data may be transformed into microcode that may be written by an RFID writer to the RFID tag in a secure format. Alternatively, card data read from the card may be stored in a memory of the wireless device and subsequently written to the RFID tag or transmitted by the RFID tag during a transaction. Furthermore, in the case of a smart card, a smart card reader may instead read card data from an inserted card, as opposed to a magnetic stripe reader.

During a transaction, a user may make a secured payment with the wireless device. In such a transaction, the card data may be transmitted by an RFID chip included in the wireless device to a nearby RFID reader. For example, a card is provided to a customer by a card issuer and the customer enables a wireless device with the card. Thereafter, the customer may either use the wireless device when providing payment or may remove the card for traditional use. When a user wishes to remove the card from the wireless device, the user may press an eject button to remove the card. Further, since the wireless device may be capable of storing a card, the wireless device can also act as a wallet. When the card is removed from the card slot of the wireless device, the user retains the option of swiping the magnetic stripe of the card through a magnetic stripe reader. The user may therefore store the card in the wireless device and, when an RFID reader is unavailable, remove the card for traditional use. Other embodiments consistent with the present invention expand upon the above exemplary wallet concept and allow a user to store multiple cards in the wireless device.

A user of the wireless device may also store data for multiple cards by inserting a first card so that the device may store card data that read from the first card. The user may then remove the first card from the wireless device, and insert a second card. As the second card is inserted into the wireless device, card data may be read from the second card and made available for storage in the wireless device. After a user has stored card data for more than one card in the wireless device, the user may select a card from a menu screen shown on a display of the wireless device.

Wireless devices consistent with embodiments of the present invention may also include security features that authorize a transaction. For example, a security validation may be required every time a transaction is made with an RFID enabled wireless device, when the selected card is not stored in the device, or for repeat transactions that use a card that was inserted into the device but subsequently removed after an initial transaction. Further, card data may be encrypted using encryption techniques so that transmitted card data cannot be intercepted in an accessible form. In other exemplary embodiments, the memory of the wireless device may be erased when a card is removed from the card slot. Furthermore, a user of the wireless device may authorize different individuals to use card data stored in the memory of the wireless device for certain accounts.

Reference will now be made to exemplary embodiments of the invention, examples of which are illustrated in the accompanying drawings. Wherever possible, the same reference numbers will be used throughout the drawings to refer to the same or like parts.

FIG. 1 shows a back view of a wireless device 105 including a card slot 110 for inserting a card 120 and an eject button 112. According to the example shown in FIG. 1, wireless device 105 is preferably a cellular phone. However, wireless device 105 may be a PDA, or other handheld device, such as a Blackberry. Although wireless device 105 shows card slot 110 on the back of the device, card slot 110 may be incorporated into any appropriate location of wireless device 105. Further, card slot 110 may be oriented in any appropriate direction for receiving card 120. In exemplary embodiments, card slot 110 may include a reader (not shown) for reading card data on card 120.

Card 120 may be a financial account card, such as a credit card, a debit card, a smart card, an ATM card, or any other card associated with a financial account and that may be used to make purchase transactions. Card 120 includes, for example, account information such as information identifying the card holder, an account number, and expiration date. Preferably, due to the small size of most wireless devices, the card is a mini card. A typical mini card is nearly half the size of a standard credit card. Further, as shown in FIG. 1, according to the back view of card 120, card 120 includes magnetic stripe 122. In the case of a smart card, card 120 will include a smart card chip (not shown), which may be read by a smart card reader included in wireless device 105 in addition to, or instead of, a reader to read magnetic stripe 122.

Once card 120 is inserted into wireless device 105, a mechanism (not shown) may hold card 120 in place such that it does not fall out of wireless device 105. Furthermore, wireless device 105 may include eject button 108 for removing card 120 from wireless device 105. For example, when a user desires to remove card 120 from wireless device 105, the user may press eject button 108, which ejects card 120 through card slot 110.

Figure 2:
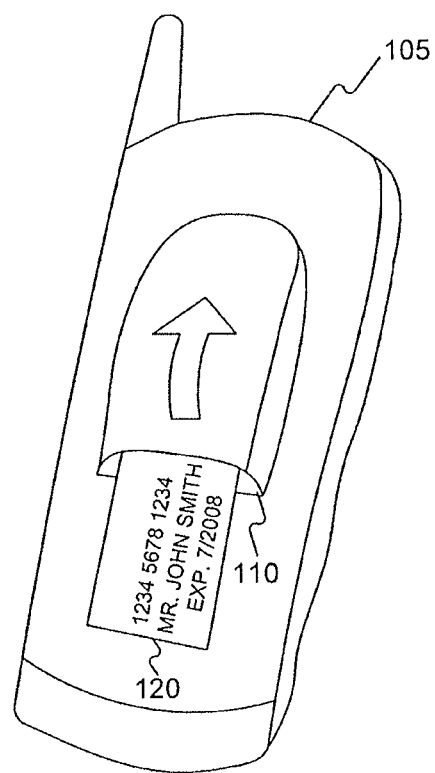
FIG. 2 shows an example of a financial account card being inserted into the card slot of the wireless device shown in FIG. 1.

FIG. 2 shows card 120 being inserted into card slot 110 of wireless device 105. When card 120 is inserted into card slot 110 of wireless device 105, a magnetic stripe reader (not shown) may read card data stored on magnetic stripe 122. Alternatively, card 120 may include a smart card chip, which may be reader by a smart card reader (not shown) included in wireless device 105. Card data may be stored in a memory of wireless device 105 or may be used to program an RFID tag included in wireless device 105, as described in further detail below. Wireless device 105 may optionally include a second card slot (not shown) for inserting a second card for storage. For example, the ability to store the second card inside of wireless device 105 provides functionality to a user similar to a traditional wallet. In such an example, wireless device 105 would store both cards, which would then be available for removal from wireless device 105. Further, in an embodiment consistent with the present invention including a second card slot, wireless device 105 may or may not include functionality for reading the second card. For example, in some embodiments, it may be necessary for a user to remove the second card from the second card slot and insert the second card into the first card slot in order for the magnetic stripe reader to read card data from the second card.

Figure 3:
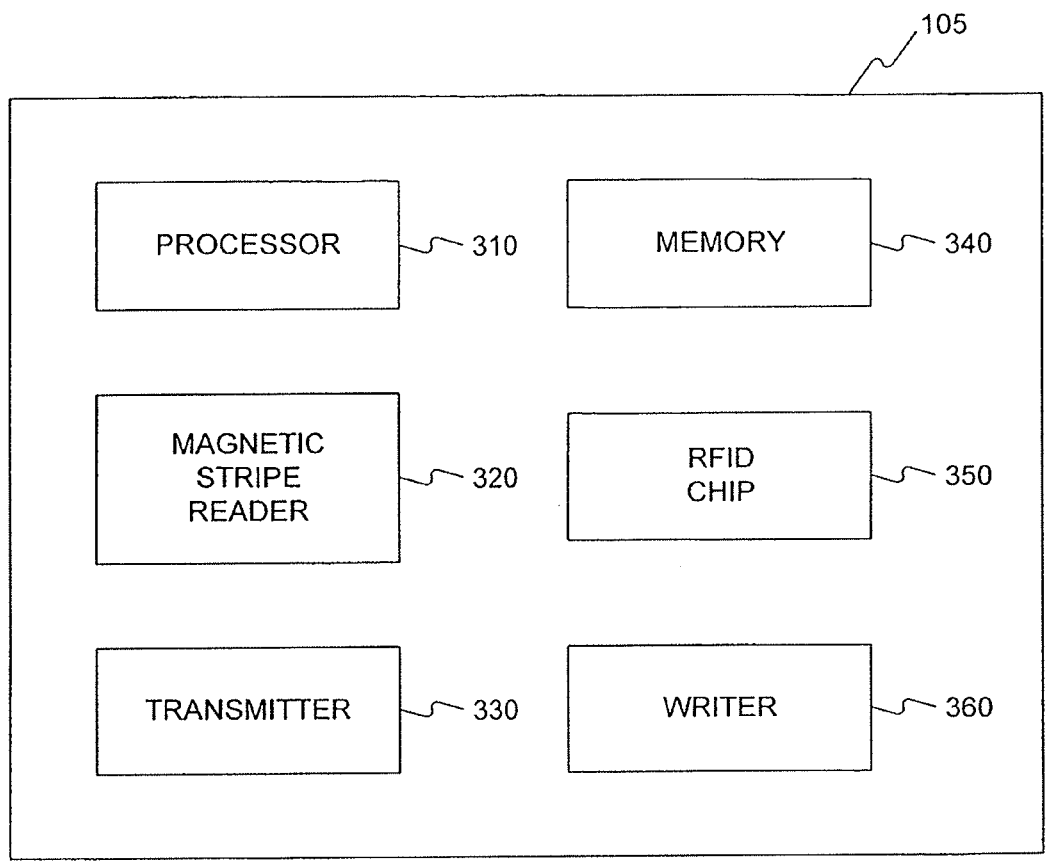
FIG. 3 is an exemplary block diagram of the components of the wireless device of FIG. 1.

FIG. 3 shows a block diagram of the components of wireless device 105. For example, wireless device 105 may include a processor 310, a magnetic stripe reader 320, a transmitter 330, a memory 340, an RFID chip 350, and an RFID writer 360. Other components that may be included in wireless device 105 include a battery (not shown) for supplying power to transmitter 330 and RFID chip 350. Furthermore, wireless device 105 may include a sensor (not shown) for detecting the presence of a card. Still further, wireless device 105 may include a smart card reader (not shown) in addition to, or in place of, magnetic stripe reader 320.

Processor 310 may instruct magnetic stripe reader 320 to read card data from a card as it is inserted into wireless device 105. Alternatively, a smart card reader included in wireless device 105 may read data from the card. Further, card data that has been read from a card may be stored in memory 340 or may be written by RFID writer 360 to RFID chip 350. Transmitter 330 may be used in addition to RFID chip 350 to transmit card data and/or other data from wireless device 105. For example, transmitter 330 may be used to boost the signal strength of radio frequency signals sent from wireless device 105.

Figure 4:
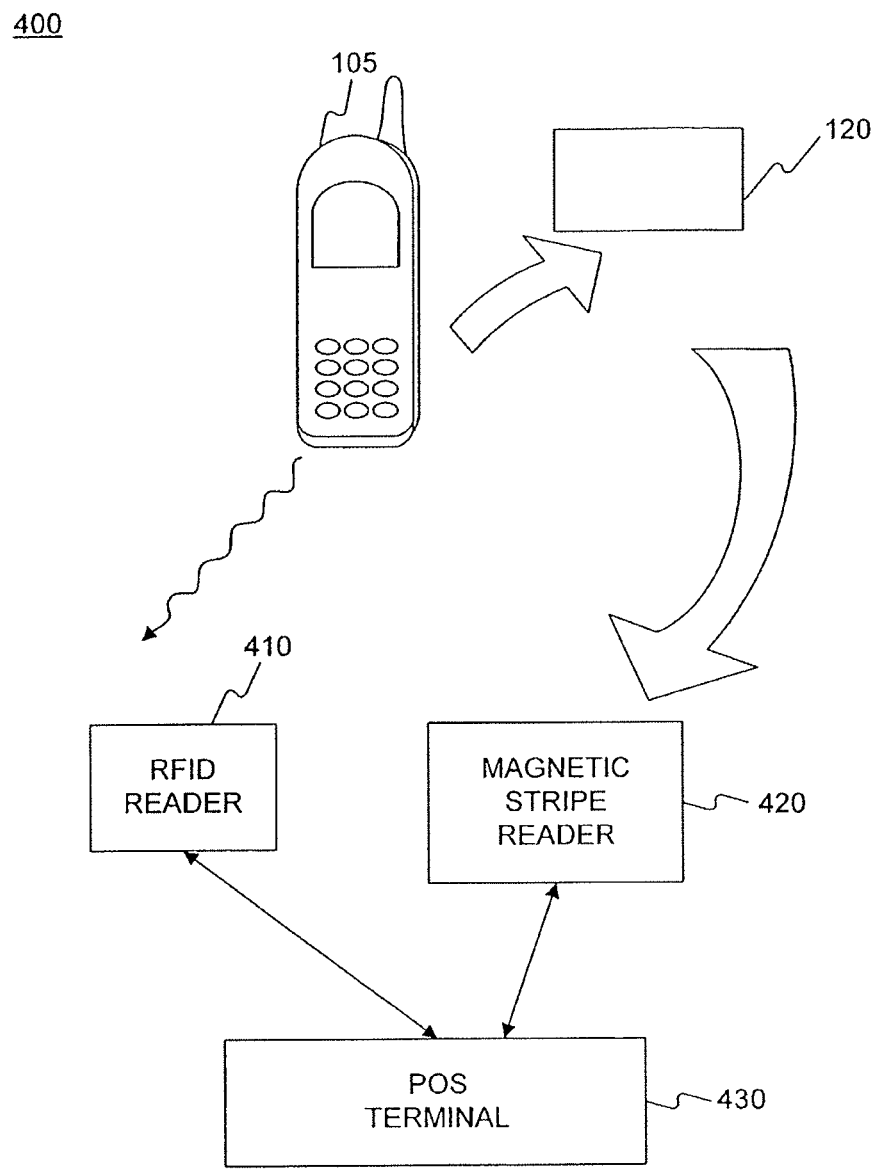
FIG. 4 is an exemplary diagram of an interaction between a wireless device, an RFID reader, and a magnetic stripe reader.

FIG. 4 shows an exemplary diagram 400 of an interaction between wireless device 105, an RFID reader 410, and a magnetic stripe reader 420. RFID reader 410 and magnetic stripe reader 420 may be connected to a point-of-sale (POS) terminal 430. POS terminal 430 receives data from RFID reader 410 and magnetic stripe reader 420 to process a transaction. A merchant may use POS terminal 430 to input data describing a purchase and to verify payment information obtained by RFID reader 410 and/or magnetic stripe reader 420.

Once POS terminal 430 has received payment information, such as account information for a credit card, POS terminal 430 may transmit the payment information in a secure format over a network (not shown) in a process that is consistent with a typical purchase transaction, such as that involving a credit card. In such a credit card transaction, for example, once an external server (not shown) verifies and approves the credit card transaction, authorization for the transaction may be sent over the network to POS terminal 430.

As shown in FIG. 4, wireless device 105 may also transmit payment information by radio frequency to RFID reader 410. In such a situation, a user will hold wireless device 105 near RFID reader 410 at, for example, the direction of the merchant or after being prompted by a message shown on a display (not shown) of RFID reader 410 requesting the user to provide payment information. Alternatively, card 120 may be removed from wireless device 105 and swiped through magnetic stripe reader 420. In such a situation, the user retains the ability to use the card for payment when a merchant does not have RFID technology for accepting payment information.

Figure 5:
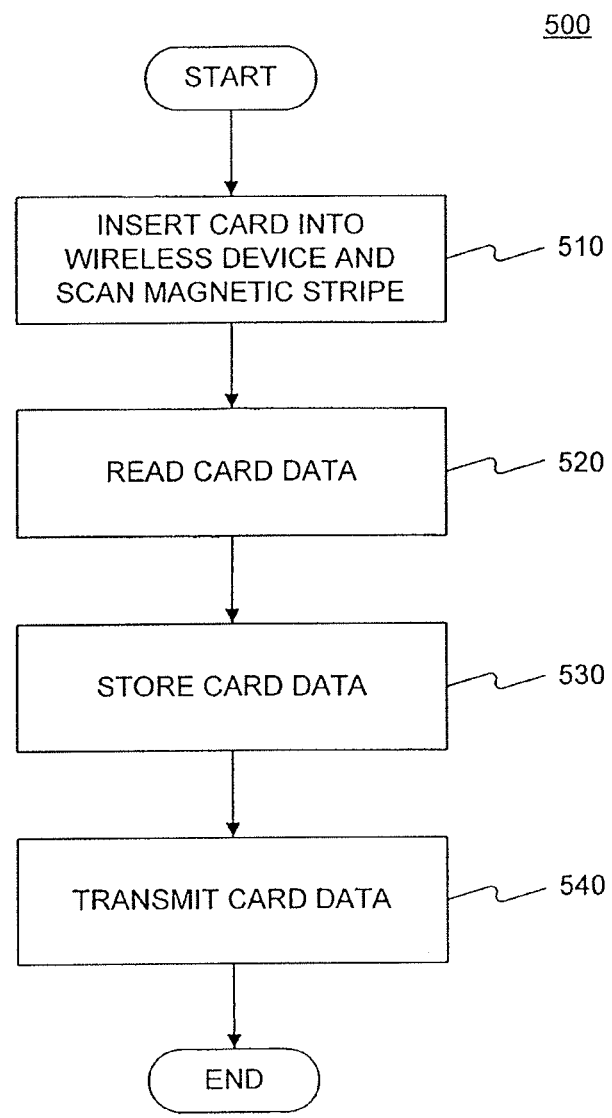
FIG. 5 is an exemplary flow diagram of a method for enabling a wireless device to store card data.

FIG. 5 shows an exemplary flow diagram 500 of a method for enabling wireless device 105 to store card data. In step 510, at the start of the process, a card may be inserted into card slot 110 of wireless device 105. As the card is inserted into card slot 115 of wireless device 105, magnetic stripe scanner 320, which may be included in wireless device 105, may scan a magnetic stripe on the card to read card data. (Step 520.) The card may be physically stored inside of wireless device 105 after it is inserted and read. Next, the card data may be stored in memory 340 included in wireless device 105 in an encrypted form, as shown in step 530. Alternatively, RFID writer 360 may program RFID chip 340 to store card data in an encrypted format. In step 540, when a user of wireless device 105 wishes to make a purchase, the user may instruct wireless device 105 to transmit the card data from wireless device 105 to RFID reader 410 via radio frequency.

Figure 6:
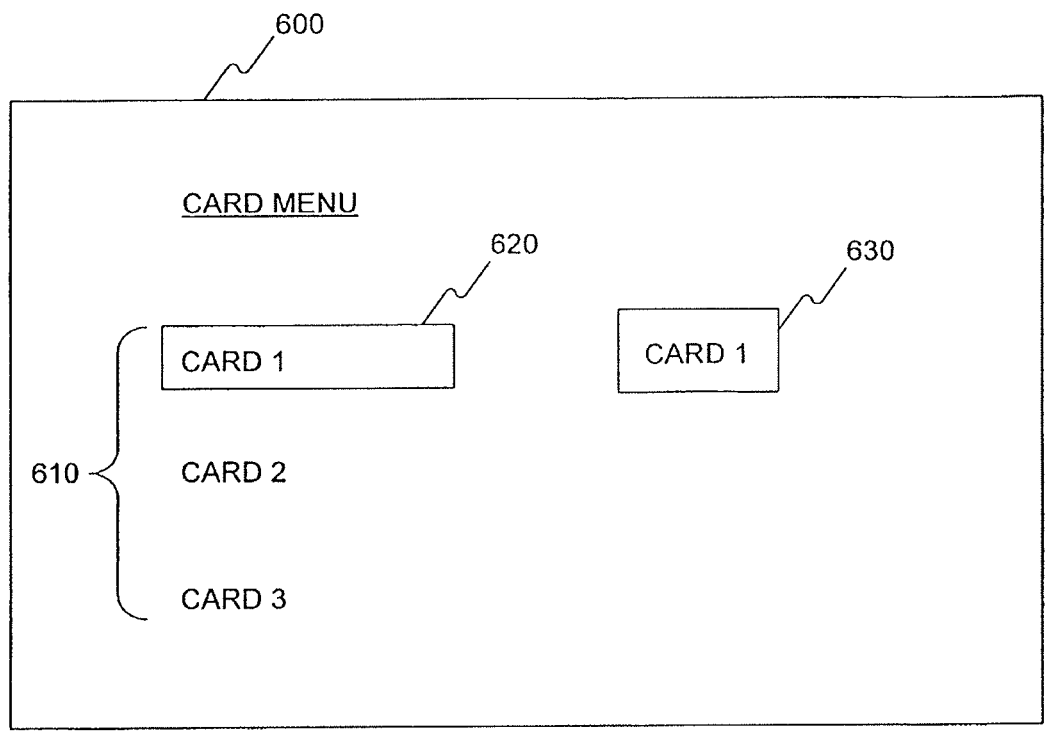
FIG. 6 is an exemplary menu of stored cards that is shown on a display of a wireless device.

FIG. 6 shows an exemplary display 600 of wireless device 105, which may include a menu 610 of cards that have card data stored in wireless device 105. As shown in FIG. 6, menu 610 may include a list of three cards designated as card 1, card 2, and card 3. Further, card 1 is shown as having been selected by selection box 620. Selection box 620 may be, for example, a highlighted border surrounding a selected item shown on display 600. A user may make a selection from menu 610 by using input keys (not shown) of wireless device 105, or by touching display 600. Furthermore, as shown in the exemplary embodiment of FIG. 6, card 1 may also be represented by image 630, which shows a graphical image of a card. Alternatively, card 1 may be selected for use in making a purchase by selecting image 630 using input keys or by touching display 600. Image 630 may be an image of a credit card, a logo, text, or any graphical image that the user has associated with card 1.

For example, a user may access menu 610 on wireless device 105. As shown in FIG. 6, menu 610 displays one or more cards that have card data stored in wireless device 105. The user may select a card, such as card 1, by using input keys, for example, from menu 610. Alternatively, the user may select card 1 by selecting image 630. Thereafter, the user may use wireless device 105 to make a purchase with card 1. A user may therefore make selections from menu 610 to select a particular card for a transaction. Security features, which are discussed in more detail below, may be used to determine whether a transaction may proceed with a selected card. For example, in some embodiments consistent with the present invention, a security code may be required before a selected card may be used to make a transaction.

Figure 7:
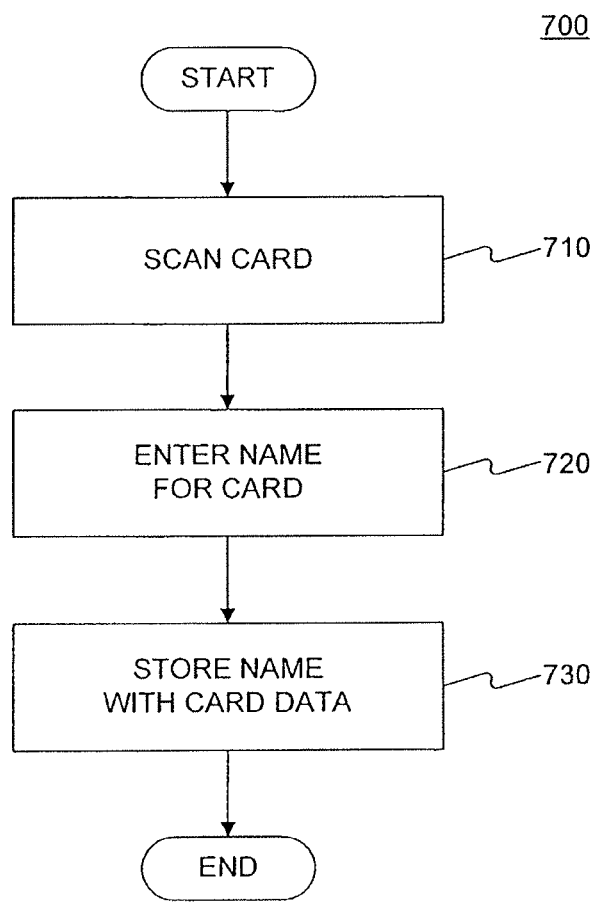
FIG. 7 is an exemplary flow diagram of a method for storing card data in a wireless device.

FIG. 7 shows an exemplary flow diagram 701 of a method for storing card data in wireless device 105. As a card is inserted into card slot 115 of wireless device 105, card data may be scanned by magnetic stripe reader 320. (Step 710.) The scanned card data may be stored in memory 340 included in wireless device 105. Next, a user may specify a name that identifies the card. (Step 720.) For example, the user may select a default name, such as MasterCard or Visa, or may enter a personalized name via input keys. The card data may then be stored in memory 340 such that the card data is associated with the stored name selected by the user. (Step 730.) Thereafter, the user may select the card, for example, from menu 610 as shown in FIG. 6, for use in a transaction by selecting the stored name. Alternatively, as discussed above, the user may select a card by selecting a text name, a graphical image, or logo from display 600.

Figure 8:
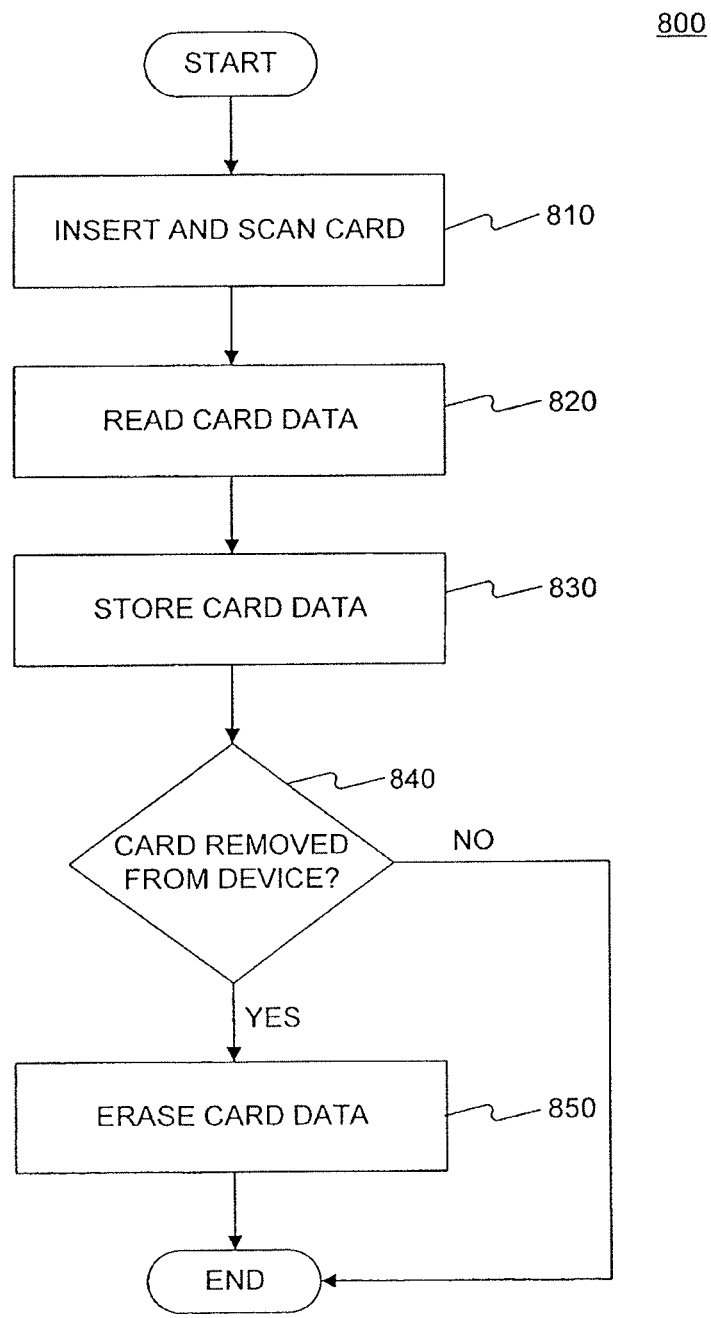
FIG. 8 is an exemplary flow diagram of a method for providing a security feature for card data stored in a wireless device.

FIG. 8 shows an exemplary flow diagram 800 of a method for providing a security feature for card data stored in wireless device 105. In step 810, a card is inserted into card slot 115 of wireless device 105. The card may be subsequently stored inside wireless device 105. Magnetic stripe reader 320 included in wireless device 105 scans a magnetic stripe as, for example, the card is inserted into card slot 115, such that reader 320 can read card data from the magnetic stripe. (Step 820.) The card data is stored in memory 330 included in wireless device 105. (Step 830.) Next, processor 310 may receive from a sensor an indication of whether or not the card has been removed from wireless device 105. If the card has been removed from card slot 115 because, for example, a user has pressed eject button 111 on wireless device 105, an instruction may be sent by processor 310 to memory 340 or RFID chip 350 to erase the stored card data. (Step 850.) As a result, card data for a removed card is no longer available via wireless device 105. A user will therefore be required to insert a card into wireless device 105, thereby requiring the user to have physical possession of the card.

Figure 9:
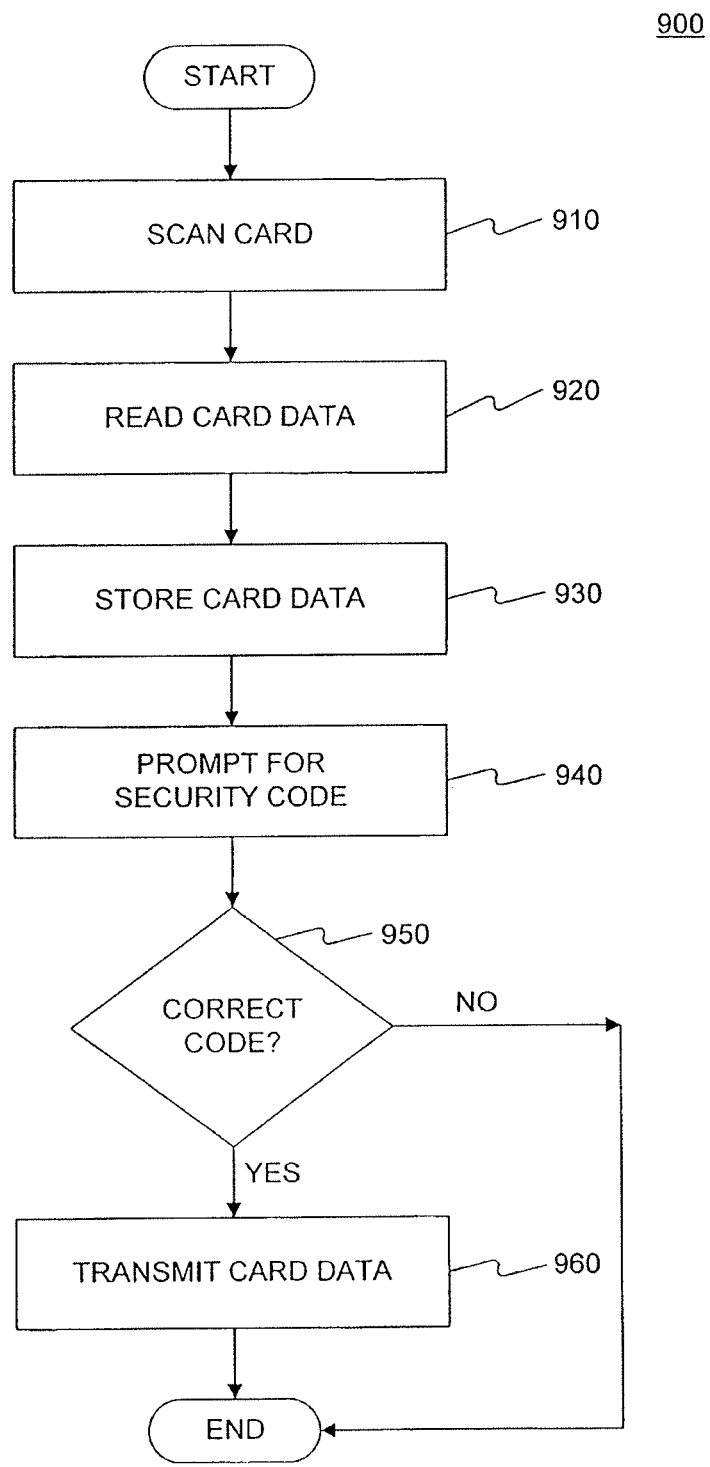
FIG. 9 is an exemplary flow diagram of a method for authorizing use of a card to make a purchase with a wireless device.

FIG. 9 shows an exemplary flow diagram 900 of a method for authorizing use of a card to make a purchase with wireless device 105. Magnetic stripe reader 320 included in wireless device 105 scans a magnetic stripe on the card. (Step 910.) Card data is read from the magnetic stripe. (Step 920.) The card data may be stored in memory 340 or in RFID chip 350 included in wireless device 105. (Step 930.) When a user selects the card for making a purchase, a prompt may require the user to enter a security code to authorize use of the card data. (Step 940.) In step 950, processor 310 may determine whether the correct security code has been entered by comparing the entered code with a code stored in memory 340 of wireless device 105. For example, the security code may be stored in an encrypted form in wireless device 105. After validating the security code, use of the card data is authorized and wireless device 105 transmits, when the security code has been authenticated, the card data from wireless device 105, as shown in step 960. If the security code was incorrectly entered, the process ends.

For example, card data may be transmitted from wireless device 105 to a nearby RFID reader. The RFID reader may be included in and/or connected to a POS terminal, as shown in FIG. 4. Further, the security code may be entered by the user via input keys on wireless device 105. Alternatively, the security code may be entered by the user at the POS terminal and transmitted over a network to an external server for validation. The security code may be a personal identification number (PIN). In other embodiments consistent with the present invention, instead of a security code, authorization may be provided by a fingerprint, voice print, or retinal scan of the user. Also, in any of the above embodiments, the security code may be received by wireless device 105 or by a POS terminal.

Figure 10:
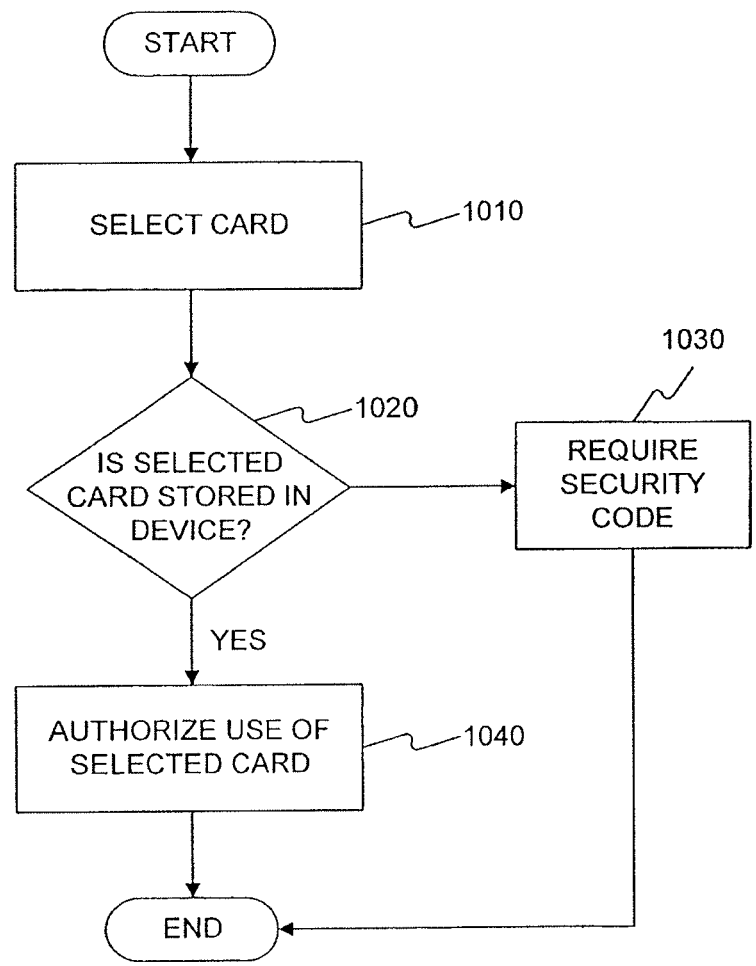
FIG. 10 is an exemplary flow diagram of a method for authorizing use of a card to make a purchase with a wireless device.

FIG. 10 shows an exemplary flow diagram 1000 of a method for authorizing use of a card to make a purchase with wireless device 105. A user may select a card to make a purchase from display 600 of wireless device 105 using menu 610. (Step 1010.) Processor 310 included in wireless device 105 may determine whether the selected card is stored inside the wireless device. (Step 1020.) When the selected card is not determined to be stored inside wireless device 105, wireless device 105 may require a security code. (Step 1030.) When the selected card is determined to be stored inside wireless device 105, t device 105 may become authorized to use the selected card. (Step 1040.) In the event that use of the card is authorized, card data for the card may be transmitted via radio frequency.

Figure 11:
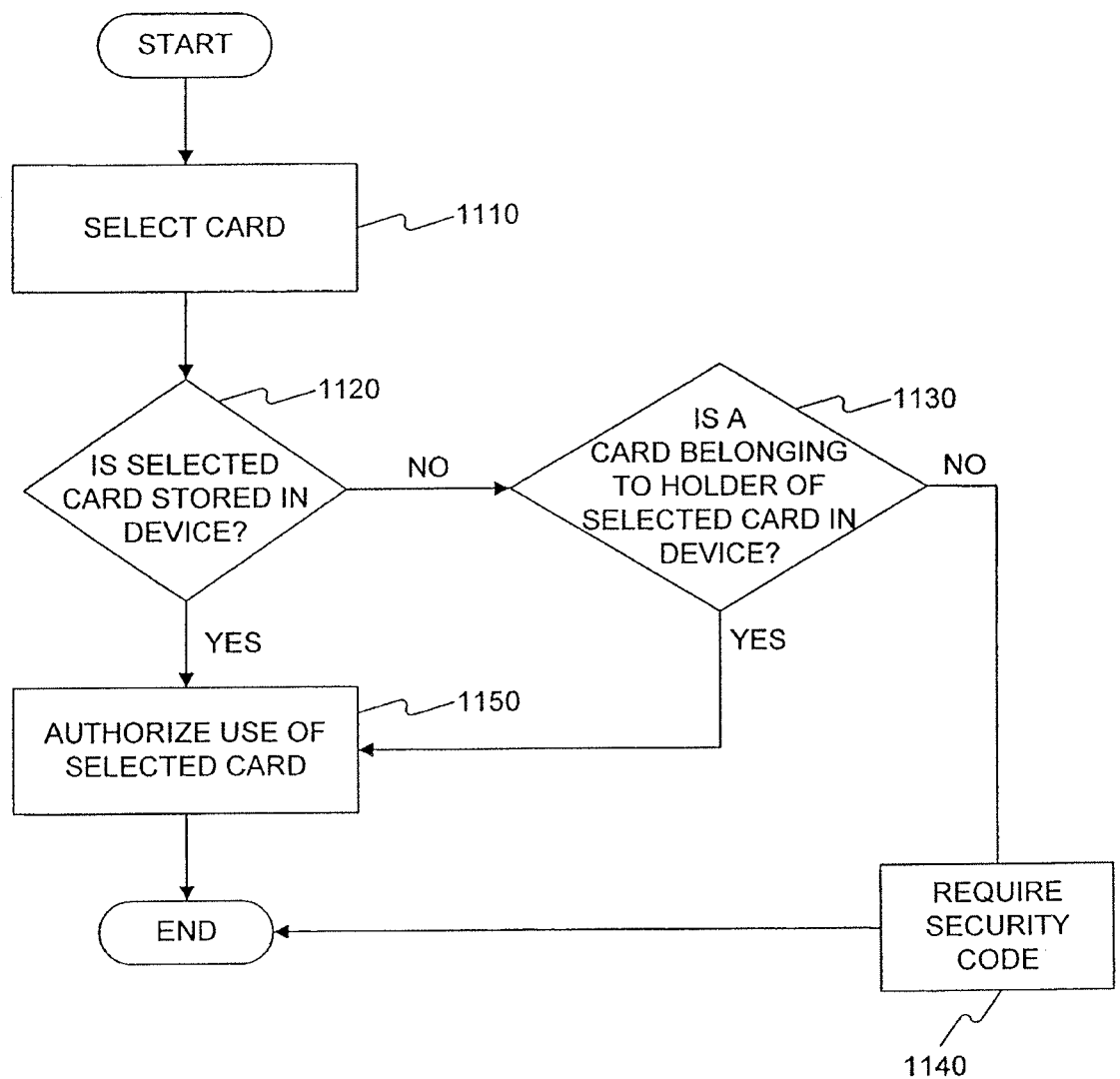
FIG. 11 is an exemplary flow diagram of a method for authorizing a card to make a payment using a wireless device.

FIG. 11 shows an exemplary flow diagram 1100 of a method for authorizing a card to make a payment using wireless device 105. A user may select a card to make a purchase from a display of wireless device 105 using menu 600. (Step 1110.) When the selected card is determined to be stored inside wireless device 105 (step 1120—"Yes"), the wireless device may become authorized to use the selected card. (Step 1150.) When the selected card is not determined to be stored inside wireless device 105 (step 1120—"No"), processor 310 included in wireless device 105 may determine whether any other card belonging to the user is stored inside the wireless device. (Step 1130.) When any card belonging to the user is determined to be stored inside the wireless device (step 1130—"Yes"), use of the selected card is authorized, and the process may proceed to step 1150. In step 1150, use of the selected card is authorized. However, in step 1130, when a card belonging to the user is not determined to be stored inside the wireless device (step 1130—"No"), the process may proceed to step 1140, and wireless device 105 may require a security code or prohibit use of the selected card. Furthermore, a user of wireless device 105 may have to establish his or her identity by providing, for example, a PIN. The identify of an owner of a card stored in the wireless device may be determined by accessing encrypted data stored in wireless device 105.

Figure 12:
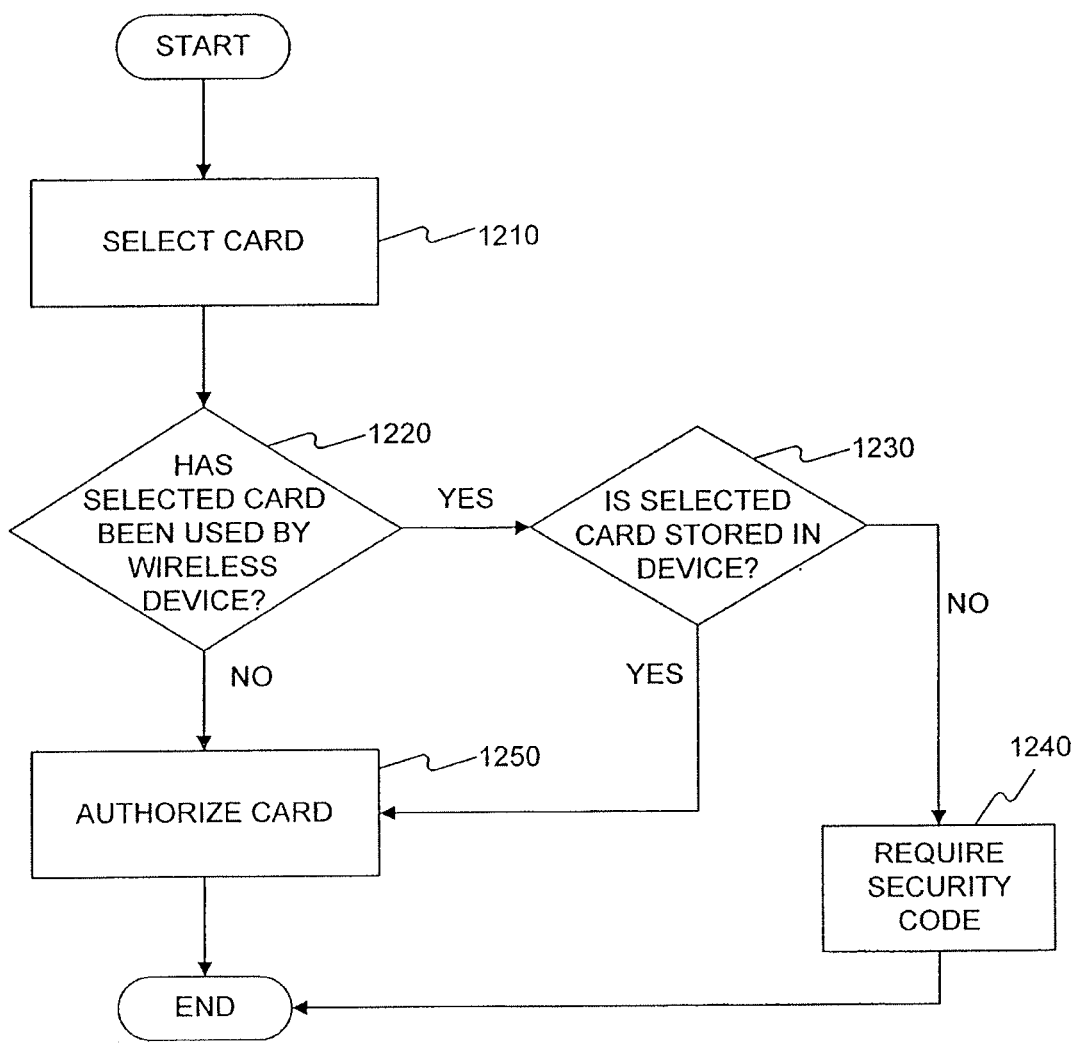
FIG. 12 is an exemplary flow diagram of a method for authorizing of a card to make a purchase using a wireless device.

FIG. 12 shows an exemplary flow diagram 1200 of a method for authorizing of a card to make a purchase using wireless device 105. Authorization may be required only for repeat transactions using a particular card and not the initial transaction. For example, the user may select a card to make a purchase from menu 610 of wireless device 105. (Step 1210.) Processor 310 included in wireless device 105 may determine whether the selected card has been used to make a prior purchase with wireless device 105. (Step 1220.) When the card has not been used to make a prior purchase using wireless device 105, the process proceeds to step 1250 and use of the card is authorized. When the card has been used to make a prior purchase using wireless device 105, processor 310 determines whether the selected card is stored in wireless device 105. (Step 1230.) When the selected card is not stored in wireless device 105, wireless device 105 may require a security code. (Step 1240.) If the selected card is stored in wireless device 105, the process proceeds to step 1250, and the card is authorized.

Figure 13:
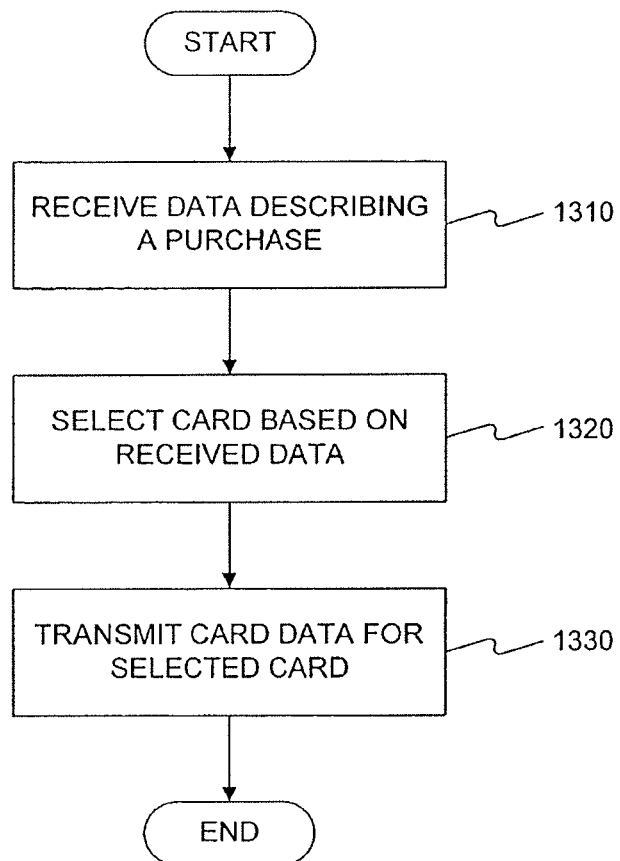
FIG. 13 is an exemplary flow diagram of a method for selecting a card to provide a payment for a purchase made using a wireless device.

FIG. 13 shows an exemplary flow diagram 1300 of a method for selecting a card to provide a payment for a purchase made using wireless device 105. In step 1310, wireless device 105 may receive, via radio frequency from a POS terminal 430, data reflecting a purchase transaction. Using the received data, wireless device 105 may automatically select a card to provide the payment for the purchase. (Step 1320.) Next, wireless device 105 transmits via radio frequency card data for the selected card to POS terminal 430. (Step 1330.) Accordingly, a card may be selected automatically by the wireless device 105 based upon received purchase transaction data. For example, a user may specify that food purchases should use a specified account for payment and that gasoline purchases may automatically use a different account that is specified by the user.

Figure 14:
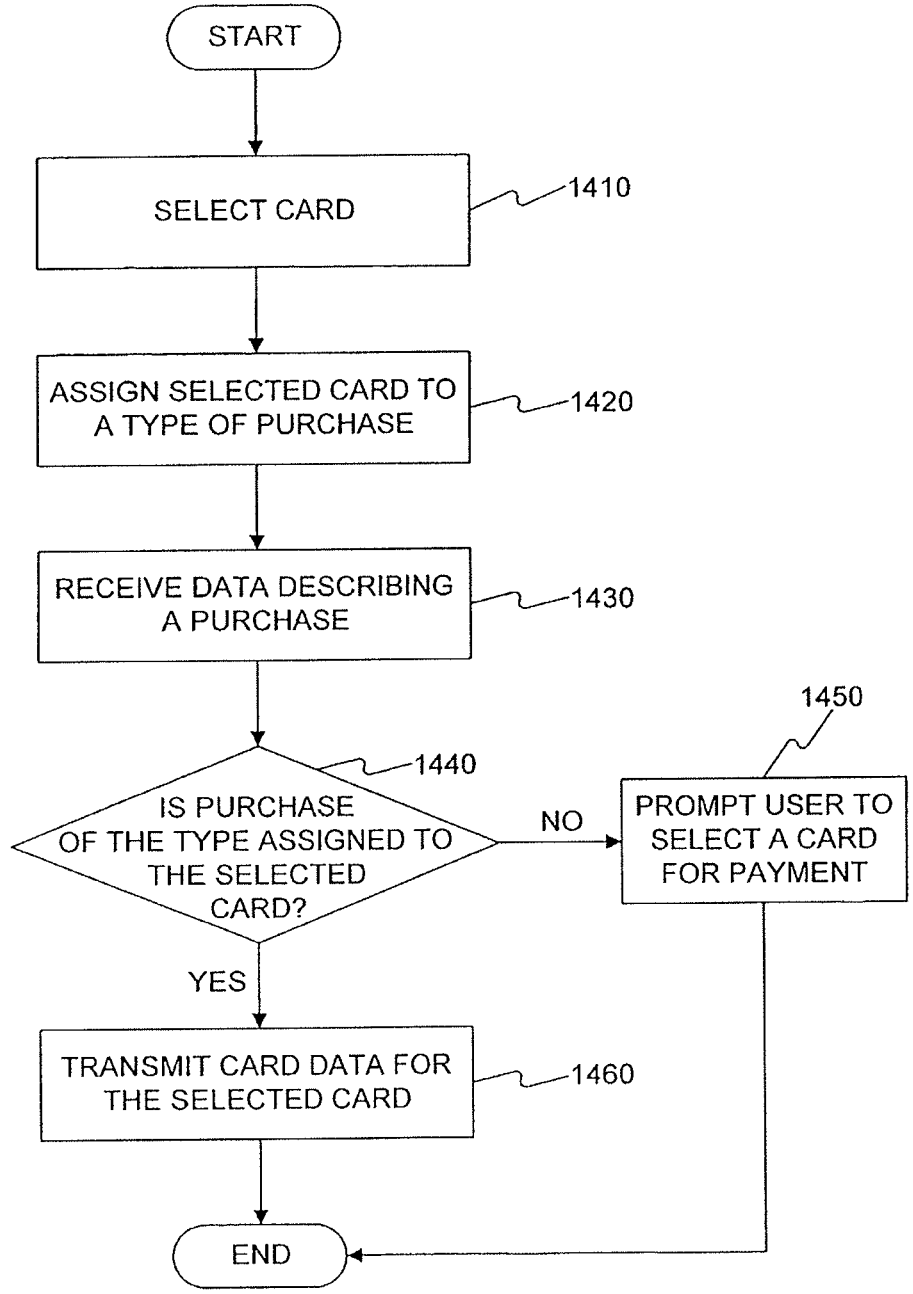
FIG. 14 is an exemplary flow diagram of a method for assigning a card for providing a payment using a wireless device.

FIG. 14 shows an exemplary flow diagram 1400 of a method for assigning a card for providing a payment using a wireless device. In step 1410, a card is selected from menu 600 shown on a display of wireless device 105. The selected card may be assigned to a type of purchase by the user. (Step 1420.) Subsequently, wireless device 105 may receive, via radio frequency from a POS terminal 430, data reflecting a purchase transaction. (Step 1430.) Processor 310 included in wireless device 105 may determine whether the purchase is of the type assigned to the selected card. (Step 1440.) When the purchase is determined to be of the type assigned to the selected card, wireless device 105 may transmit card data for the selected card to POS terminal 430. (Step 1460.) When the purchase is determined not to be of the type assigned to the selected card, wireless device 105 may prompt the user to select a card for payment. Step 1450.

Figure 15:
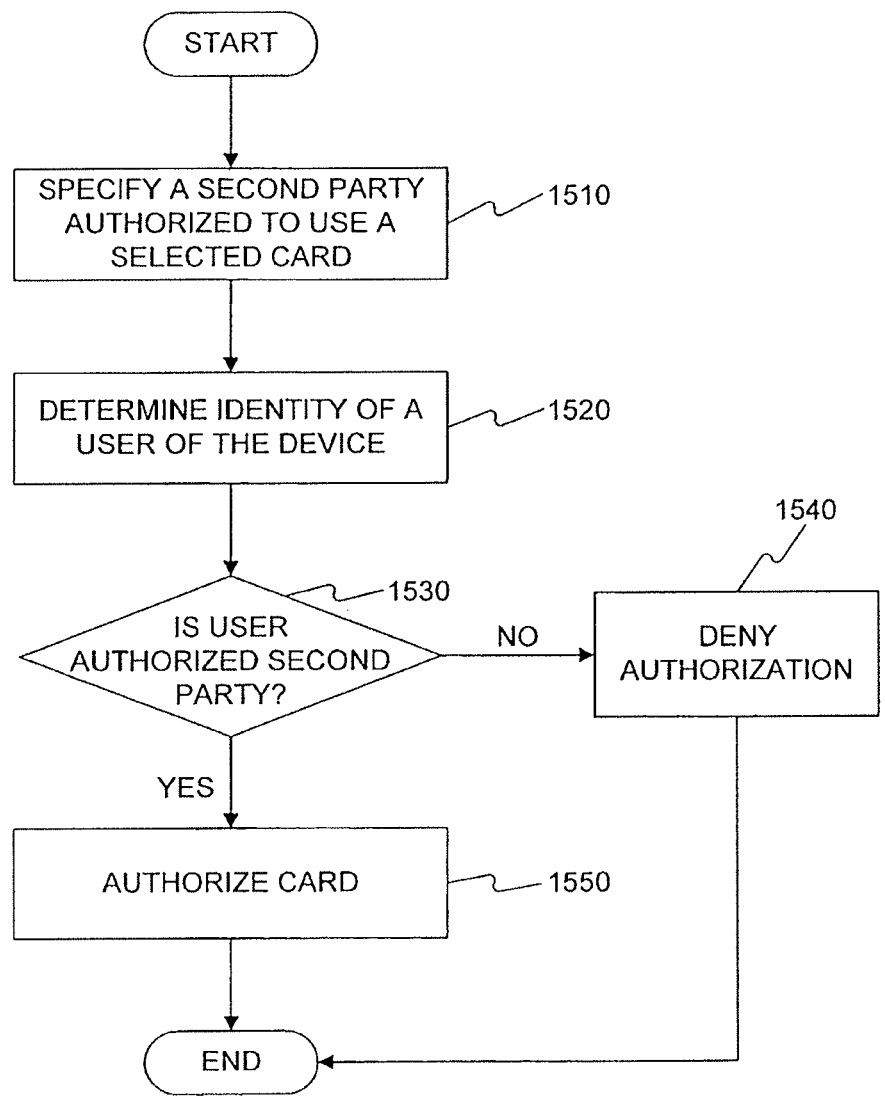
FIG. 15 is an exemplary flow diagram of a method for authorizing a second party to use a card to make a purchase with a wireless device.

FIG. 15 shows an exemplary flow diagram 1500 of a method for authorizing a second party to use a card to make a purchase with wireless device 105. In step 1510, a user may select a card from menu 610 shown on display 600 of wireless device 105. The user may have previously assigned to the selected card an identity of a second party that is authorized to use the selected card. Accordingly, processor 310 included in wireless device 105 may next determine in step 1520 an identity of a user of wireless device 105. This may be done by validating a security code or other information, such as biometrics. When the identity of the user of the wireless device 105 is determined to be an authorized second party (step 1530—"Yes"), device 105 may authorize use of the selected card to make a purchase. (Step 1550.) Otherwise (step 1530—"No"), the process proceeds to step 1540 and authorization is denied.

Accordingly, in systems consistent with the invention, a wireless device may be enabled to receive a card that is inserted into a card slot of the wireless device. The wireless device may read card data from the card and transmit the card data via radio frequency to a nearby RFID reader. The card may also be ejected from the wireless device and swiped by a magnetic stripe reader. Furthermore, in embodiments consistent with the present invention, security features may prevent unauthorized use of card data stored in a wireless device.

The foregoing descriptions have been presented for purposes of illustration and description. They are not exhaustive and do not limit the invention to the precise form disclosed. Modifications and variations are possible in light of the above teachings or may be acquired from practicing of the invention. For example, the described implementation includes software but the present invention may be implemented as a combination of hardware and software or in hardware alone.

Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

Other embodiments of the invention will be apparent to those skilled in the art from consideration of the specification and practice of the invention disclosed herein. The specification and examples should be considered as exemplary only, with a true scope and spirit of the invention being indicated by the following claims.

What is claimed is:

1. A system for generating a screening interface for communications, the system comprising:
   one or more processors; and a non-transitory computer-readable storage medium storing instructions, which when executed by the one or more processors cause the one or more processors to:
  detect a request for a communication from a first communication device to a second communication device;
  receive a first profile associated with the first communication device, wherein the first profile comprises a plurality of entries for a plurality of records, wherein the plurality of records is associated with a first entity corresponding to the first communication device; and
  in response to determining that the first profile includes entries having an account identifier associated with the second communication device, select an entry of the entries based on a recency of timestamps associated with the entries, and generate for display on a communication acceptance screen an indicator of an entry associated with a latest timestamp.

2. The system of claim 1, wherein the instructions, when executed by the one or more processors, further cause the one or more processors to:
  detect a second request for a second communication from a third communication device to the second communication device;
  determine a second identifier associated with the third communication device;
  determine whether the second identifier is stored in a database;
  in response to determining that the second identifier is stored in the database, retrieve a second profile associated with the third communication device, wherein the second profile comprises a risk level associated with a second entity corresponding to the second profile; and
  in response to determining that the risk level satisfies a threshold, modify or replace an interactive icon that enables accepting the communication with an indication of the risk level.

3. The system of claim 2, wherein the instructions further, cause the one or more processors to:
  determine based on a session initiation protocol identifier certificate an attestation level associated with the first communication device; and
  generate the risk level for the first communication device based on the attestation level.

4. The system of claim 1, wherein the instructions, when executed by the one or more processors, further cause the one or more processors to:
  retrieve the entry of the plurality of entries that includes the account identifier;
  determine, based on the entry, an item associated with an account corresponding to the account identifier; and
  generate for display on the communication acceptance screen an indication of the item.

5. A method comprising:
  detecting a request for a communication from a first communication device to a second communication device;
  receiving a first profile associated with the first communication device, wherein the first profile comprises one or more entries corresponding to an entity associated with the first communication device;
  determining whether the one or more entries include an account identifier associated with the second communication device; and
  in response to determining that the one or more entries include the account identifier, generating for display, on a communication acceptance screen, an indicator of an entry of the one or more entries that includes the account identifier.

6. The method of claim 5, further comprising:
  determining that the one or more entries do not include any entry with the account identifier and includes a second entry with a different account identifier; and
  in response to determining that the one or more entries do not include the account identifier and includes the different account identifier, generating for display, on the communication acceptance screen, an indication of the entity associated with the first communication device.

7. The method of claim 5, further comprising:
  in response to determining that a first identifier associated with the first communication device is not stored in a database, modify or replace an interactive communication acceptance icon with indication that the first identifier is not stored in the database.

8. The method of claim 5, wherein retrieving the account identifier associated with the second communication device comprises:
  retrieving a second identifier associated with the second communication device;
  comparing the second identifier with a plurality of identifiers associated with a plurality of accounts;
  determining, based on comparing the second identifier with the plurality of identifiers, that the second identifier matches a identifier corresponding to an account of the plurality of accounts; and
  retrieving the account identifier associated with the account of the plurality of accounts.

9. The method of claim 5, wherein the communication acceptance screen comprises a date associated with the entry of the one or more entries.

10. The method of claim 5, further comprising:
  detecting a second request for a second communication from a third communication device to the second communication device;
  determining a second identifier associated with the third communication device;
  determining whether the second identifier is stored in a database;
  in response to determining that the second identifier is stored in the database, retrieving a second profile associated with the third communication device, wherein the second profile comprises a flag that indicates a risk level associated with the third communication device; and
  in response to determining that the risk level satisfies a threshold, modifying or replacing an interactive icon with an indication of the risk level.

11. The method of claim 5, further comprising:
  determining based on a session initiation protocol identifier certificate an attestation level associated with the first communication device; and
  generating a risk level for the first communication device based on the attestation level.

12. The method of claim 5, further comprising:
  retrieving the one or more entries that include the account identifier;
  determining, based on the one or more entries, an item associated with an account corresponding to the account identifier; and generating for display, on the communication acceptance screen, an indication of the item.

13. A non-transitory, computer-readable medium for generating a screening interface for communications, storing instructions that when executed by one or more processors, cause the one or more processors to perform operations comprising:

detecting a request for a communication from a first communication device to a second communication device;

receiving a first profile associated with the first communication device, wherein the first profile comprises one or more entries corresponding to an entity associated with the first communication device;

determining whether the one or more entries include an account identifier associated with the second communication device; and in response to determining that the one or more entries include the account identifier, generating for display, on a communication acceptance screen, an indicator of an entry of the one or more entries that includes the account identifier.

14. The non-transitory, computer-readable medium of claim 13, wherein the instructions further cause the one or more processors to perform operations comprising:

determining that the one or more entries do not include any entry with the account identifier and includes a second entry with a different account identifier; and in response to determining that the one or more entries do not include the account identifier and includes the different account identifier, generating for display, on the communication acceptance screen, an indication of the entity associated with the first communication device.

15. The non-transitory, computer-readable medium of claim 13, wherein the instructions further cause the one or more processors to perform operations comprising:

in response to determining that a first identifier associated with the first communication device is not stored in a database, modifying or replacing an interactive communication acceptance icon with an indication that the first identifier is not stored in the database.

16. The non-transitory, computer-readable medium of claim 13, wherein the instructions for retrieving the account identifier associated with the second communication device further cause the one or more processors to perform the operations comprising:

retrieving a second identifier associated with the second communication device;

comparing the second identifier with a plurality of identifiers associated with a plurality of accounts;

determining, based on comparing the second identifier with the plurality of identifiers, that the second identifier matches a identifier corresponding to an account of the plurality of accounts; and retrieving the account identifier associated with the account of the plurality of accounts.

17. The non-transitory, computer-readable medium of claim 13, wherein the communication acceptance screen comprises a date associated with the entry of the one or more entries.

18. The non-transitory, computer-readable medium of claim 13, wherein the instructions further cause the one or more processors to perform operations comprising:

detecting a second request for a second communication from a third communication device to the second communication device;

determining a second identifier associated with the third communication device;

determining whether the second identifier is stored in a database;

in response to determining that the second identifier is stored in the database, retrieving a second profile associated with the third communication device, wherein the second profile comprises a flag that indicates a risk level associated with the third communication device; and in response to determining that the risk level satisfies a threshold, modifying or replacing an interactive icon with an indication of the risk level.

19. The non-transitory, computer-readable medium of claim 13, wherein the instructions further cause the one or more processors to perform operations comprising:

determining based on a session initiation protocol identifier certificate an attestation level associated with the first communication device; and generating a risk level for the first communication device based on the attestation level.

20. The non-transitory, computer-readable medium of claim 13, wherein the instructions further cause the one or more processors to perform operations comprising:

retrieving the one or more entries that include the account identifier;

determining, based on the one or more entries, an item associated with an account corresponding to the account identifier; and generating for display, on the communication acceptance screen, an indication of the item.

* * * * *

UNITED STATES PATENT AND TRADEMARK OFFICE
CERTIFICATE OF CORRECTION

PATENT NO. : 11,790,366 B2
APPLICATION NO. : 18/045507
DATED : October 17, 2023
INVENTOR(S) : Gregory Gannon It is certified that error appears in the above-identified patent and that said Letters Patent is hereby corrected as shown below:

In the Claims

Columns 12-16, delete Claims 1-20 and insert the following listing of claims therefor:
-- 1. A system for real-time, cyber incident detection in parallel processed communications using machine learning models trained in data sparse environments, the system comprising: storage circuitry configured to store: a machine learning model, wherein the machine learning model is trained in data sparse environments to generate, using a gradient boosted decision tree, dual variable outputs based on fixed-length feature inputs representing potential cyber incidents, and wherein the gradient boosted decision tree comprises a loss function that estimates the accuracy of the machine learning model, a plurality of decision trees, and an additive model; control circuitry configured to: receive, at a cyber incident detection system, a communication from a remote terminal, wherein the communication is processed in parallel by a third-party verification system and the cyber incident detection system; determine, at the cyber incident detection system, a fixed-length feature input for the communication, wherein the fixed-length feature input includes a standardized identifier corresponding to the remote terminal; input the fixed-length feature input into the machine learning model to generate a dual variable output, wherein the dual variable output comprises a communication classification and a confidence level of the communication classification; determine, based on the dual variable output, whether the communication is fraudulent and/or unauthorized; and input/output circuitry configured to: in response to determining that the communication is fraudulent and/or unauthorized, transmit a cancelation request to the remote terminal.

2. A method for real-time, cyber incident detection in parallel processed communications using machine learning models trained in data sparse environments, the method comprising: receiving, at a server, a communication from a remote terminal; determining, at the server, a fixed-length feature input for the communication, wherein the fixed-length feature input includes a standardized identifier corresponding to the remote terminal; inputting the fixed-length feature input into a machine learning model to generate a dual variable output, wherein the machine learning model is trained in data sparse environments to generate, using a gradient boosted decision tree, dual variable outputs based on fixed-length feature inputs representing potential cyber incidents;

Signed and Sealed this
Fourteenth Day of October, 2025

John A. Squires
*Director of the United States Patent and Trademark Office* determining, based on the dual variable output, whether to generate a cancelation recommendation to the remote terminal; and in response to determining to generate the cancelation recommendation to the remote terminal.

3. The method of claim 2, further comprising: determining, using the machine learning model, a first variable output of the dual variable output, wherein the first variable output comprises a communication classification, and wherein the communication classification comprises a binary representation of whether the communication is fraudulent and/or unauthorized; and determining, using the machine learning model, a second variable output of the dual variable output, wherein the second variable output comprises a confidence level of the communication classification.

4. The method of claim 3, wherein determining whether to generate the cancelation recommendation comprises: determining, using the machine learning model, a first value of the first variable output of the dual variable output; selecting a first confidence threshold of a plurality of confidence thresholds based on the first variable output having the first value; determining, using the machine learning model, a second value of the second variable output of the dual variable output; and comparing the second value to the first confidence threshold to determine whether to generate the cancelation recommendation.

5. The method of claim 3, wherein determining whether to generate the cancelation recommendation comprises: determining, using the machine learning model, a first value of the first variable output of the dual variable output; retrieving a communication characteristic of the communication from the remote terminal, wherein the communication characteristic is not included in the fixed-length feature input; and selecting a first confidence threshold of a plurality of confidence thresholds based on the first value and the communication characteristic.

6. The method of claim 5, wherein selecting the first confidence threshold of the plurality of confidence thresholds based on the first value and the communication characteristic further comprises: retrieving a user profile corresponding to the communication; retrieving a user characteristic from the user profile; and comparing the user profile to the user characteristic to determine which of the plurality of confidence thresholds to select.

7. The method of claim 2, wherein determining, at the server, the fixed-length feature input for the communication further comprises: retrieving source identification information from the communication; and inputting the source identification information into a database listing standardized identifiers corresponding to respective source identification information to determine the standardized identifier.

8. The method of claim 2, further comprising: determining a response time for the cancelation recommendation; and selecting the machine learning model from a plurality of machine learning models based on the response time.

9. The method of claim 8, further comprising: determining a threshold response time, wherein the threshold response time is based on an amount of time required for a third-party verification system to process the communication in parallel; and generating a deadline for generating the cancelation recommendation to the remote terminal based on the threshold response time.

10. The method of claim 2, wherein determining the fixed-length feature input for the communication further comprises: generating a multithread communication based on the communication; and generating a plurality of processing requests based on the multithread communication.

11. The method of claim 2, wherein the machine learning model has an accuracy above ninety-five percent and a precision above ninety percent.

12. A non-transitory, computer-readable medium, comprising instructions that, when executed by one or more processors, cause operations comprising: receiving, at a server, a communication from a remote terminal; determining, at the server, a fixed-length feature input for the communication, wherein the fixed-length feature input includes a standardized identifier corresponding to the remote terminal; inputting the fixed-length feature input into a machine learning model to generate a dual variable output, wherein the machine learning model is trained in data sparse environments to generate, using a gradient boosted decision tree, dual variable outputs based on fixed-length feature inputs representing potential cyber incidents; determining, based on the dual variable output, whether to generate a cancelation recommendation to the remote terminal; and in response to determining to generate the cancelation recommendation to the remote terminal, transmitting the cancelation recommendation to the remote terminal.

13. The non-transitory, computer-readable medium of claim 12, wherein the instructions further cause operations comprising: determining, using the machine learning model, a first variable output of the dual variable output, wherein the first variable output comprises a communication classification, and wherein the communication classification comprises a binary representation of whether the communication is fraudulent and/or unauthorized; and determining, using the machine learning model, a second variable output of the dual variable output, wherein the second variable output comprises a confidence level of the communication classification.

14. The non-transitory, computer-readable medium of claim 13, wherein determining whether to generate the cancelation recommendation comprises: determining, using the machine learning model, a first value of the first variable output of the dual variable output; selecting a first confidence threshold of a plurality of confidence thresholds based on the first variable output having the first value; determining, using the machine learning model, a second value of the second variable output of the dual variable output; and comparing the second value to the first confidence threshold to determine whether to generate the cancelation recommendation.

15. The non-transitory, computer-readable medium of claim 13, wherein determining whether to generate the cancelation recommendation comprises: determining, using the machine learning model, a first value of the first variable output of the dual variable output; retrieving a communication characteristic of the communication from the remote terminal, wherein the communication characteristic is not included in the fixed-length feature input; and selecting a first confidence threshold of a plurality of confidence thresholds based on the first value and the communication characteristic.

16. The non-transitory, computer-readable medium of claim 15, wherein selecting the first confidence threshold of the plurality of confidence thresholds based on the first value and the communication characteristic further comprises: retrieving a user profile corresponding to the communication;

retrieving a user characteristic from the user profile; and comparing the user profile to the user characteristic to determine which of the plurality of confidence thresholds to select.

17. The non-transitory, computer-readable medium of claim 12, wherein determining, at the server, the fixed-length feature input for the communication further comprises: retrieving source identification information from the communication; inputting the source identification information into a database listing standardized identifiers corresponding to respective source identification information to determine the standardized identifier.

18. The non-transitory, computer-readable medium of claim 12, wherein the instructions further cause operations comprising: determining a response time for the cancelation recommendation; and selecting the machine learning model from a plurality of machine learning models based on the response time.

19. The non-transitory, computer-readable medium of claim 18, wherein the instructions further cause operations comprising: determining a threshold response time, wherein the threshold response time is based on an amount of time required for a third-party verification system to process the communication in parallel; and generating a deadline for generating the cancelation recommendation to the remote terminal based on the threshold response time.

20. The non-transitory, computer-readable medium of claim 12, wherein determining the fixed-length feature input for the communication further comprises: generating a multithread communication based on the communication; and generating a plurality of processing requests based on the multithread communication. --